W. F. CURRAN.
COOKING UTENSIL.
APPLICATION FILED MAY 26, 1915.

1,178,301.

Patented Apr. 4, 1916.
2 SHEETS—SHEET 1.

WITNESSES
Frank C. Palmer.
J. L. McAuliff

INVENTOR
W. F. Curran
BY Munn & Co
ATTORNEYS

W. F. CURRAN.
COOKING UTENSIL.
APPLICATION FILED MAY 26, 1915.
1,178,301.
Patented Apr. 4, 1916.
2 SHEETS—SHEET 2.
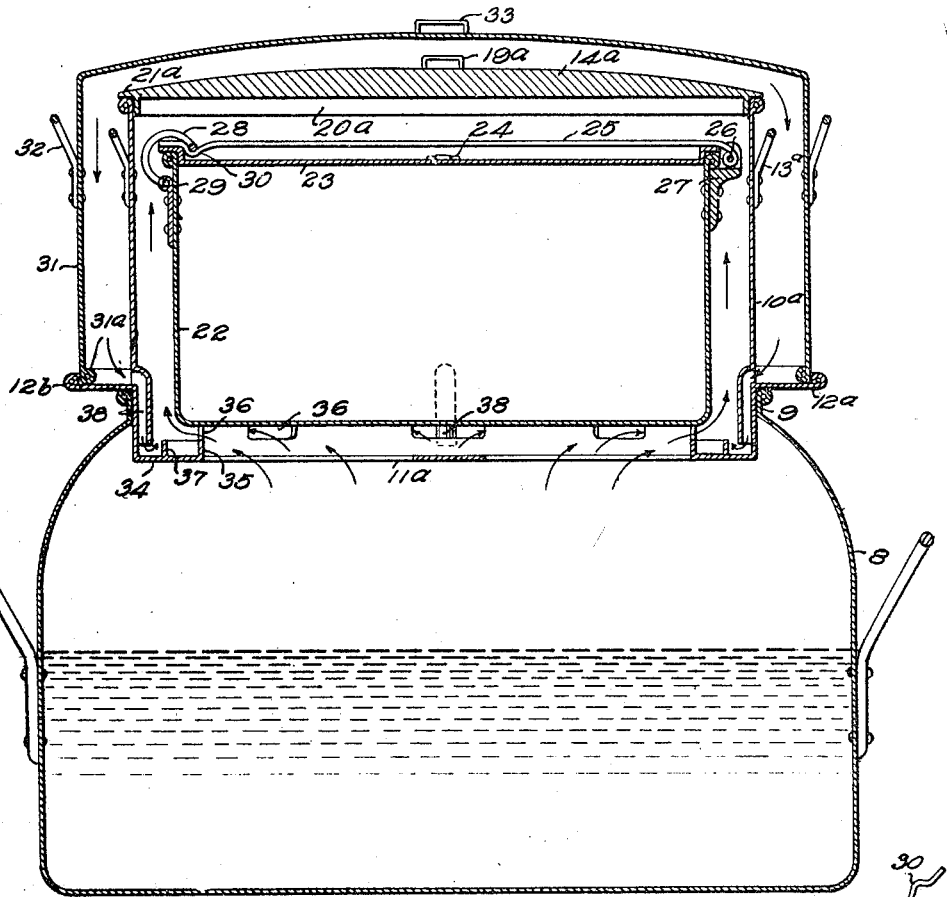
Fig. 5
Fig. 4
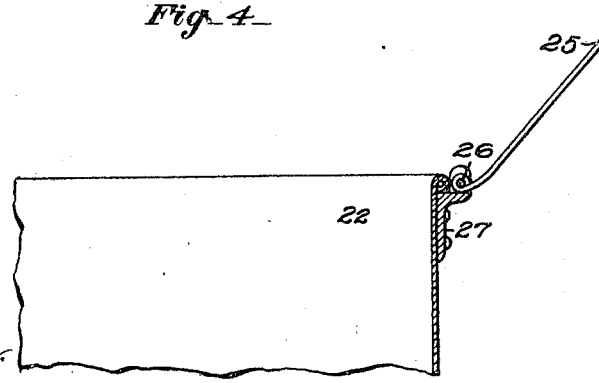
WITNESSES
Frank C. Palmer
J. L. McAuliffe
INVENTOR
W. F. Curran
BY Munn & Co
ATTORNEYS

UNITED STATES PATENT OFFICE.

WILLIAM FERRIS CURRAN, OF WACO, TEXAS.

COOKING UTENSIL.

1,178,301.   Specification of Letters Patent.   Patented Apr. 4, 1916.

Application filed May 26, 1915. Serial No. 30,515.

*To all whom it may concern:*

Be it known that I, WILLIAM F. CURRAN, a citizen of the United States, and a resident of Waco, in the county of McLennan and State of Texas, have invented a new and Improved Cooking Utensil, of which the following is a full, clear, and exact description.

My invention relates to double cookers for domestic cooking purposes. The ordinary double boiler, by reason of the wasteful escape of steam, tends to dissipate the water in a short time, and is liable also to boil over, so that the utensil requires constant attention.

A prime object of the present invention is to provide a domestic double boiler which may be used for continuous cooking for a long period, without replenishing the water supply.

A further object of the invention is to improve the general efficiency of double boilers of the indicated character.

Figure 1:
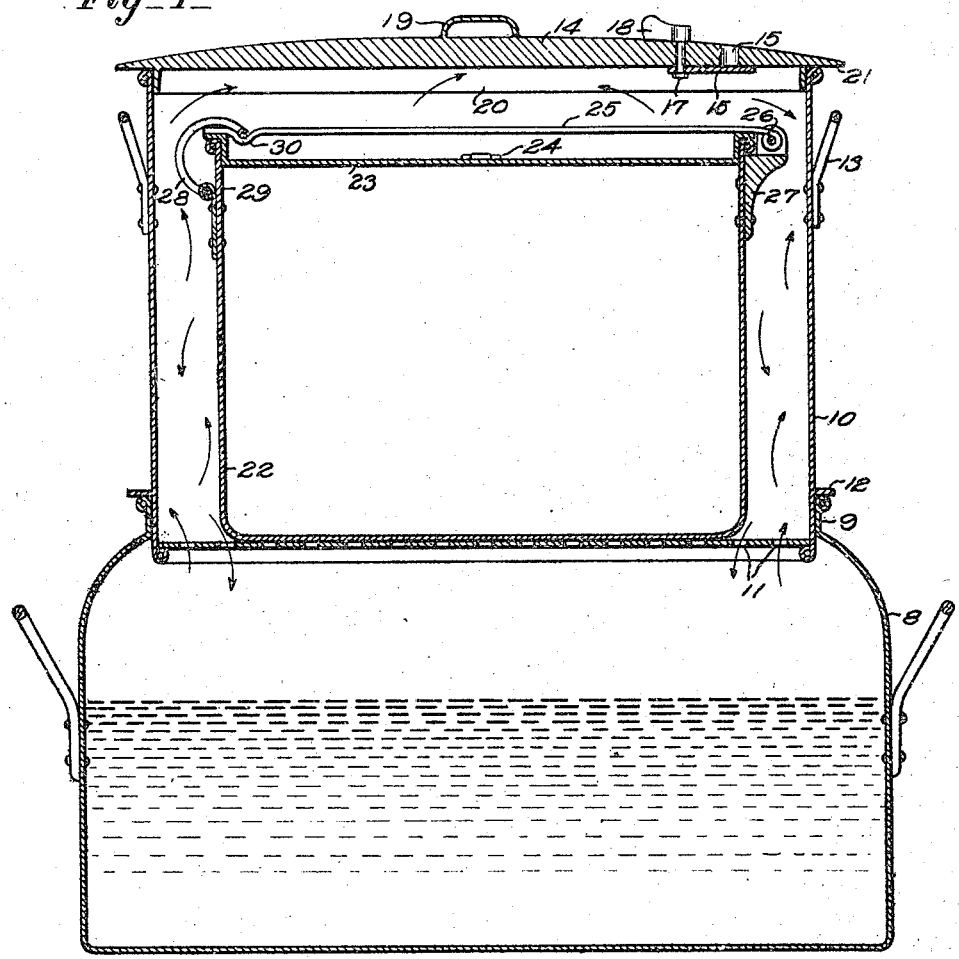
Figure 2:
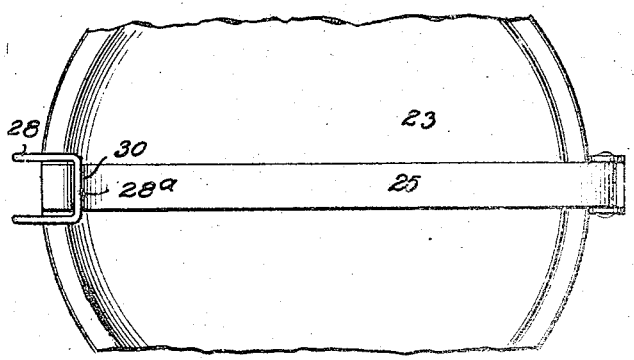
Figure 3:
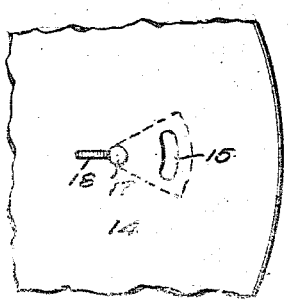

Reference is had to the accompanying drawings forming part of this specification, in which similar characters of reference indicate corresponding parts in all the views, and in which:

Figure 1 is a vertical section of a double boiler constructed in accordance with my invention; Fig. 2 is a fragmentary plan view of the inner food container of the utensil; Fig. 3 is a fragmentary plan view of the valved vent in the cover of the steam jacket; Fig. 4 is a fragmentary vertical section of the inner food container, showing the latch bar for the cover; and Fig. 5 is a view similar to Fig. 1, but illustrating another form of the invention.

Referring particularly to Figs. 1 to 4, my invention as illustrated there comprises a vessel 8 adapted to contain water to be boiled for generating steam, said vessel having a neck or rim 9. Supported on the vessel 8 is a steam jacket 10 having a bottom open to constitute an inlet for steam to the jacket from the vessel 8, there being shown in said bottom perforations 11 for the purpose. An annular flange or ledge 12 is formed on the steam jacket 10 at the exterior, sufficiently above the bottom thereof to allow said ledge to rest upon the upper edge of the rim 9 of the vessel 8, with the lower end of the steam jacket below said ledge fitting within said rim. The steam jacket 10 has handles 13 on the sides thereof, of any suitable form, and it is provided with a removable cover 14. The said cover 14 is formed preferably with a vent opening 15 for the escape of steam, when this is thought desirable. The vent is closed by a valve plate 15 disposed at the inner side of the cover and mounted on a vertical pin 17 extending upwardly through the cover 14, and provided with a suitable finger piece 18, whereby the valve may be swung to a position to close or open the vent 15. The cover 14 may be provided with any suitable handle 19 at the top, and desirably it has a depending annular flange 20 fitting the upper end of the steam jacket, the rim 21 of the cover extending laterally outside of the depending flange 20 to rest on the top of the steam jacket 10. A container 22 is supported within the steam jacket 10 preferably by resting the same on the bottom of the steam jacket. The container 22 is spaced at the sides and the top from the steam jacket and its cover 14 to provide a surrounding steam space, which through the perforations 11 is in communication with the interior of the vessel 8. A removable cover 23 on the container 22 fits snugly in place and may have any suitable handle, such as a ring 24 of known form. In order to fasten the cover 23 in position, a latch bar 25 is pivoted at one end as at 26 to a bracket 27 on the exterior of the container at one side, and the free end of said fastener bar extends to the opposite side of the container and is adapted to be engaged by a clasp 28, which is hinged at its lower end as at 29 to the exterior of the container. The clasp 28 is of curved form and presents side members united by a cross-bar 28ª, said cross-bar being adapted to be received in a depression 30 formed in the fastener bar. By the described arrangement, when the vessel 8 is placed on a stove, or other heating means, steam rising from the said vessel will enter the steam jacket, so that on all sides of the container 22 the latter will be effectively subjected to heat. The steam will condense against the sides of the steam jacket and the underside of the cover 14, so that very little will tend to escape beneath the said cover. Also, the fit of the lower end of the steam jacket in the vessel 8 and the provision of the ledge 12 prevent the free escape of steam, so that a supply of water in the vessel 8 is conserved, and will last a long period.

In the form shown in Fig. 5, the vessel 8 and its rim are the same as in Fig. 1. Similarly, the container 22 with its appurtenances, is in all respects the same as shown in Fig. 1, and the parts are therefore lettered to correspond.

The steam jacket 10ª, in the form shown in Fig. 5, has bottom openings 11ª, the central portion of the bottom being in the form of a grid presenting the said openings. Above the bottom the steam jacket is formed at the exterior with an annular ledge 12ª having a bead 12ᵇ at the edge thereof at the upper side of the ledge. Handles 13ª similar to the handles 13 are provided on the steam jacket as well as a cover 14ª having a handle 19ª, a depending annular flange 20ª and a rim 21ª substantially as in the first described construction. In connection with the steam jacket 10ª I provide an exterior shell 31, so that the steam jacket has double walls separated by a second steam space. The shell 31 is in the form of a dome which may have side handles 32 and a top handle 33, for convenience. The lower edge of the shell 31 is beaded as at 31ª and rests on the ledge 12ª snugly against the bead 12ᵇ thereof.

In order to cause the live steam from the vessel 8 to pass upward into the space between the container 22 and the steam jacket, I provide a steam trap which will return the water of condensation from the exterior space within the shell 31 while preventing the escape of steam from the vessel 8 to said exterior space. The steam trap comprises a channel 34 formed annularly around the open central portion of the bottom of the steam jacket 10ª, the inner wall 35 of said channel terminating below the ledge 12ª and having an opening or openings 36 therein at the upper edge. The container 22 rests upon the wall 35 and the openings therefore permit the passage of steam from the vessel 8 through the openings 11ª and 36 to the space between the container 22 and the steam jacket. To conduct water of condensation from the outer chamber to the channel 34, ducts 38 are provided which lead through the steam jacket 10ª adjacent to the ledge 12ª downwardly into the channel 34. There may be an additional annular lip or wall 37 in the channel 34 between the outer wall thereof and the inner wall 35 to effect a quick water seal of the duct or ducts 38.

By the described arrangement any steam that passes beneath the cover 14ª of the steam jacket 10ª, will be condensed within the shell 31, and will find its way back to the vessel 8, as water of condensation from the space between the container 22 and the steam jacket. The construction insures the maximum conservation of the water in the vessel 8, since there is practically no tendency of the steam to escape from the utensil.

In both constructions the fastener bar 25 for the cover 23 of the food container, when in the closed position, is accommodated beneath the cover 14 or 14ª of the steam jacket. It is to be understood also that in the form shown in Fig. 5, in practice the vent 15 and the valve therefor, as shown in Fig. 1, may be employed.

Having thus described my invention, what I claim as new and desire to secure by Letters Patent, is:

1. In a double boiler, a covered steam jacket having means to removably rest the same on a water heating vessel and formed with a steam inlet in the bottom to receive steam from said vessel, an inner container removably supported within the steam jacket to contain material to be cooked, said container being closed at the bottom and sides and spaced from the steam jacket at the sides and top to form a steam chamber, and a cover on the container.

2. In a double container, a covered steam jacket having means whereby to support the same on a water heating vessel, and presenting a depending portion to enter the vessel, the said jacket having a bottom open for the inlet of steam and having a steam trap outside the said steam inlet, the steam trap having an overflow to said inlet to permit the return of water of condensation while preventing the escape of steam to the exterior of the jacket, and a container supported within the steam jacket to receive material to be cooked.

3. In a double cooker, a covered steam jacket having means whereby to support the same on a water heating vessel, and presenting a lower portion below said means to enter the vessel, the said steam jacket having a bottom open for the inlet of steam, and having an annular channel around said steam inlet communicating with the latter, said jacket having an exterior chamber communicating with the interior thereof and a duct leading from the chamber to the said steam inlet, and a container supported within the steam jacket to receive material to be cooked.

4. In a double cooker, a steam jacket having means whereby to support the same on a water heating vessel and formed with spaced double walls, the bottom of the steam jacket being open for the inlet of steam and there being a depressed channel around the said steam inlet within the inner wall, and a duct leading from the steam space between the walls of the steam jacket to the said channel, and a container within and spaced from the inner wall of the steam jacket.

5. In a double cooker, a steam jacket having means whereby to support the same on a water heating vessel and formed with double walls of which the outer wall is removably supported at its lower end, the bottom of the steam jacket being open for the inlet of steam, there being a depressed channel around the said inlet within the inner wall of the steam jacket, and a duct leading from the space between the walls to said channel, together with a container removably supported within and spaced from the inner wall of the steam jacket.

6. In a double cooker, a steam jacket having spaced double walls, and a bottom open for the inlet of steam from a water heating vessel, and a container supported within the jacket and spaced from the inner wall thereof, there being a steam trap around the said inlet of the jacket, the said steam trap communicating with the steam inlet and connected with the space between the double walls of the steam jacket to receive water of condensation therefrom.

7. In a double cooker, a steam jacket having a bottom open to form a steam inlet and having an annular ledge at the exterior above said bottom adapted to rest on a water heating vessel, there being an annular channel surrounding the said steam inlet, and a duct leading from the said ledge inwardly to the said channel, and an exterior dome-shaped shell removably supported at its lower edge on said ledge and constituting an outer wall for the steam jacket, together with a container supported on the bottom of the steam jacket above the steam inlet thereof and spaced from the said jacket.

8. In a double cooker, a steam jacket having means to support the same on a water-heating vessel and formed with a steam inlet in the bottom to receive steam from said vessel, a removable cover for said jacket, and an inner container removably supported in said steam jacket and spaced therefrom at the sides and top.

In testimony whereof I have subscribed my name to this specification in the presence of two subscribing witnesses.

WILLIAM FERRIS CURRAN.

Witnesses:
    EDWARD E. THOMPSON,
    EDITH C. THOMPSON.